No. 731,679. PATENTED JUNE 23, 1903.
C. B. HARRISON & F. R. WETZELL.
CULTIVATOR ATTACHMENT.
APPLICATION FILED JAN. 9, 1903.
NO MODEL.
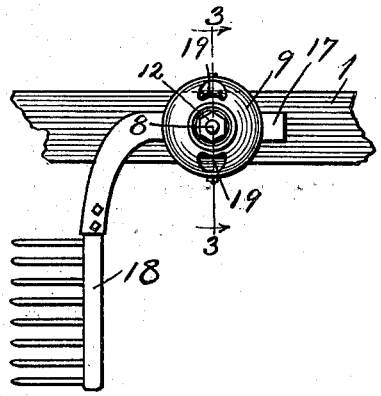
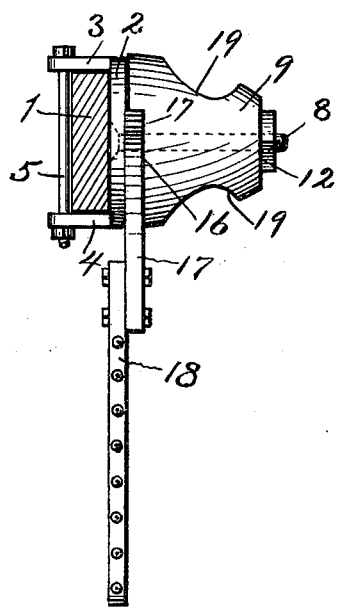
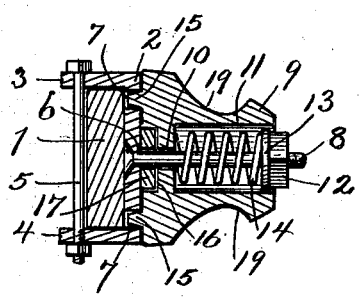
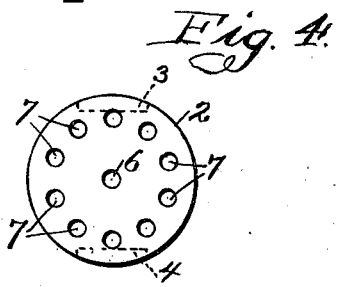
Witnesses:
R. J. Jacker
Geo. H. Johnson
Inventors:
Charles B. Harrison and
Frank R. Wetzell.
By Walter N. Haskell.
Atty.

No. 731,679. Patented June 23, 1903.

UNITED STATES PATENT OFFICE.

CHARLES B. HARRISON AND FRANK R. WETZELL, OF COLETA, ILLINOIS.

CULTIVATOR ATTACHMENT.

SPECIFICATION forming part of Letters Patent No. 731,679, dated June 23, 1903.

Application filed January 9, 1903. Serial No. 138,359. (No model.)

*To all whom it may concern:*

Be it known that we, CHARLES B. HARRISON and FRANK R. WETZELL, citizens of the United States, residing at Coleta, in the county of Whiteside and State of Illinois, have invented certain new and useful Improvements in Cultivator Attachments; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention has reference to cultivator attachments, and aims to provide a means for easily and quickly shifting the position of a cultivator-shield or similar device. As now used in some machines, the shield is attached to the beam of the cultivator by a connection which permits the adjustment of the shield by loosening a nut on a bolt and tightening the same again after the adjustment has been made. In our device we seek to avoid these two operations, thereby saving considerable time and labor in each adjustment of the shield.

Our invention possesses other advantages, which will be shown in the following specification.

In the drawings, Figure 1 is an end elevation of our invention when in use. Fig. 2 is a side elevation thereof. Fig. 3 is a vertical section in the line 3 3 of Fig. 1, with some of the parts shown in full. Fig. 4 is a detail view showing the outer face of the plate 2.

Similar numbers refer to similar parts throughout the several figures.

1 represents one of the shovel-beams of a cultivator of the kind commonly in use for cultivating corn.

2 is a circular plate secured to the beam 1 by means of projections 3 and 4, integral with the plate 2 and extending at right angles thereto. The ends of the projections 3 and 4 are united by a bolt 5, passing through perforations in such ends. The plate 2 is also provided with a central aperture 6 and a series of small holes 7 7, arranged in a circle concentric with the periphery of such plate, such holes being also in pairs diametrically in line with each other. Supported in the plate 2, by means of the opening 6, is a bolt 8, upon which is pivotally secured a cone-shaped clutch 9, such bolt passing through a perforation 10 and recess 11, formed centrally of the clutch 9.

The bolt 8 is provided with a nut 12 and washer 13, and within the recess 11 is an extensile coiled spring 14, adapted to exert a pressure against the washer 13, and thereby maintain a contact between the inner face of the clutch 9 and the plate 2.

The clutch 9 is provided on its outer face with a pair of pins 15, adapted to engage one of the pairs of holes 7 in the plate 2 and prevent a movement of the clutch upon its pivot.

16 is a recess on the inner face of the clutch 9, in which is secured the shank 17 of a shield 18, such shank being perforated to permit the passage through the same of the bolt 8.

On the outer face of the clutch 9 are two or more depressions 19, by means of which such clutch may be easily grasped by the hand of the operator and drawn away from contact with the plate 2.

To change the elevation of the shield, the clutch 9 is drawn away from the plate 2 until the pins 15 are withdrawn from the holes 7, permitting the clutch to turn upon its pivot. The shield is then raised or lowered, as desired, until the pins 15 are opposite another pair of holes 7 than those they first occupied, whereupon the clutch 9 is released by the operator, the contact between such clutch and the plate 2 is renewed, and the clutch again locked from pivotal movement by the pins 15. This operation would be the same for any tool or fixture by which the shield 18 might be replaced.

It is apparent that the tension of the spring 14 can be regulated by movement of the nut 12 upon the bolt 8.

By the method which is employed of securing the attachment to the beam of a cultivator such attachment is capable of being readily adjusted longitudinally of the beam to which it is secured by sliding the same backward or forward thereon, as desired. The weight of the attachment and shield is sufficient to prevent its working loosely upon such beam.

What we claim as our invention, and desire to secure by Letters Patent of the United States, is—

1. A cultivator attachment, comprising a circular plate, adapted to be secured to the shovel-beam of a cultivator; such plate being provided with a plurality of holes, arranged in a circle in the face of such plate, concentrically with the periphery thereof; a bolt, centrally secured in such plate, and projected at right angles thereto; a cone-shaped clutch, pivotally supported on said bolt, having its inner face normally in contact with said circular plate, and provided on such inner face with a plurality of pins adapted to engage the holes in such plate; a spring, secured centrally of such clutch, and adapted to hold the same detachably in contact with said plate; and means for supporting in said clutch the shank of a shield, substantially as set forth.

2. A cultivator attachment, comprising a circular plate; a bolt, supported centrally of such plate; a spring-controlled clutch, pivotally supported on such bolt; means for locking said clutch against pivotal movement on said bolt; means for supporting the shank of a shield in such clutch; and means for securing said plate to the shovel-beam of a cultivator, so as to be adjustable thereon; substantially as shown and described.

3. A cultivator attachment, comprising a circular plate, adapted to be secured to the shovel-beam of a cultivator; a spring-controlled clutch, adapted to be held in contact with such plate, and provided with a plurality of external depressions; means for locking such clutch against pivotal movement; and means for supporting the shank of a shield therein; substantially as shown and set forth.

In testimony whereof we affix our signatures in presence of two witnesses.

CHARLES B. HARRISON.
FRANK R. WETZELL.

Witnesses:
MILLARD HASKELL,
GEO. H. JOHNSON.